(12) United States Patent
Kunc et al.

(10) Patent No.: US 10,540,347 B2
(45) Date of Patent: Jan. 21, 2020

(54) CONTEXTUAL SEARCH DISAMBIGUATION

(71) Applicant: Nuance Communications, Inc., Burlington, MA (US)

(72) Inventors: Ladislav Kunc, Hlusice (CZ); Martin Labský, Prague (CZ); Tomáš Macek, Prague (CZ); Jan Vystrčil, Prague (CZ); Jan Kleindienst, Nove Straseci (CZ)

(73) Assignee: Nuance Communications, Inc., Burlington, MA (US)

( * ) Notice: Subject to any disclaimer, the term of this patent is extended or adjusted under 35 U.S.C. 154(b) by 1340 days.

(21) Appl. No.: 14/524,830

(22) Filed: Oct. 27, 2014

(65) Prior Publication Data

US 2016/0117360 A1    Apr. 28, 2016

(51) Int. Cl.
*G06F 16/242*  (2019.01)
*G06F 16/84*   (2019.01)
(Continued)

(52) U.S. Cl.
CPC ...... *G06F 16/243* (2019.01); *G06F 16/24573* (2019.01); *G06F 16/367* (2019.01); *G06F 16/84* (2019.01); *G06F 17/241* (2013.01)

(58) Field of Classification Search
CPC ......... G06F 17/30401; G06F 17/30654; G06F 17/30914; G06F 17/30525;
(Continued)

(56) References Cited

U.S. PATENT DOCUMENTS 6,675,159 B1 *   1/2004   Lin ..................... G06F 17/2705
2006/0036592 A1 *  2/2006   Das ................... G06F 17/30418
(Continued)

FOREIGN PATENT DOCUMENTS

WO    WO-2015080558 A1 *   6/2015   ........... G06F 17/278

OTHER PUBLICATIONS

M. Sabou et al."Evaluating the Semantic Web—A Task-Based Approach" (Eds.): ISWC/ASWC 2007, LNCS 4825, pp. 423-437, 2007 Springer-Verpag Berlin Heidlberg 2007.
(Continued)

*Primary Examiner* — James E Richardson
(74) *Attorney, Agent, or Firm* — Brian J. Colandreo; Michael T. Abramson; Holland & Knight LLP

(57) ABSTRACT

Methods, systems, computer-readable media, and apparatuses for providing search disambiguation using contextual information and domain ontologies are presented. In some embodiments, a computing device may receive a natural language input from a user. The computing device may identify a plurality of hypotheses for the natural language input. The computing device may map the plurality of hypotheses to one or more concepts of a plurality of concepts of an ontology by annotating the one or more concepts. The ontology may include the plurality of concepts respectively connected by a plurality of relations. The computing device may determine that there is an imperfect match between the annotated one or more concepts and annotations of answers. In response, the computing device may disambiguate the annotated one or more concepts using the ontology. The computing device may present output to the user based on the disambiguation.

20 Claims, 10 Drawing Sheets

(51) Int. Cl.
*G06F 16/2457* (2019.01)
*G06F 16/36* (2019.01)
*G06F 17/24* (2006.01)

(58) Field of Classification Search
CPC ............ G06F 17/30657; G06F 17/241; G06F 17/278; G06F 17/28; G06F 16/243; G06F 16/3329; G06F 16/24573; G06F 16/84; G06F 16/367; G10L 15/22; G10L 15/18; G10L 15/02
See application file for complete search history.

(56) References Cited

U.S. PATENT DOCUMENTS

| | | | | |
|---|---|---|---|---|
| 2006/0074980 | A1* | 4/2006 | Sarkar | G06F 16/958 |
| 2007/0038609 | A1* | 2/2007 | Wu | G06F 17/30675 |
| 2007/0100790 | A1* | 5/2007 | Cheyer | G09B 21/00 |
| 2008/0288235 | A1* | 11/2008 | Dettinger | G06F 16/367 703/23 |
| 2009/0119095 | A1* | 5/2009 | Beggelman | G06F 17/2785 704/9 |
| 2012/0016678 | A1* | 1/2012 | Gruber | G06F 17/3087 704/275 |
| 2012/0265528 | A1* | 10/2012 | Gruber | G10L 15/18 704/235 |
| 2012/0301864 | A1* | 11/2012 | Bagchi | G09B 7/02 434/362 |
| 2013/0018649 | A1* | 1/2013 | Deshmukh | G10L 15/26 704/9 |
| 2013/0041685 | A1* | 2/2013 | Yegnanarayanan | G16H 50/20 705/2 |
| 2014/0073882 | A1* | 3/2014 | Choi | G16H 50/20 600/301 |
| 2014/0136197 | A1* | 5/2014 | Mamou | G10L 15/08 704/235 |
| 2014/0257793 | A1* | 9/2014 | Gandrabur | G10L 15/22 704/9 |
| 2014/0365525 | A1* | 12/2014 | Pfeifer | G06F 17/30539 707/777 |
| 2015/0019228 | A1* | 1/2015 | Akolkar | G06F 17/30684 704/270.1 |
| 2015/0088888 | A1* | 3/2015 | Brennan | G06F 16/38 707/737 |
| 2015/0142704 | A1* | 5/2015 | London | G06F 16/90332 706/11 |

OTHER PUBLICATIONS

Jan. 28, 2016—International Search Report for App PCT/US2015/057304.
Jun. 2, 2017—(EP) Office Action—App 15787876.0.
Communication pursuant to Article 94(3) EPC in EP Application No. 15787876.0 dated Dec. 4, 2018.

* cited by examiner

Did you mean?

Did you mean?

○ Phone  Not Connected

○ Petrol  Connecting
Voice Dialing
Charging

○ Player

Fig. 9

Did you mean?

CONTEXTUAL SEARCH DISAMBIGUATION

FIELD

Aspects of the disclosure relate to computer hardware and software. In particular, one or more aspects of the disclosure generally relate to computer hardware and software for providing search disambiguation using contextual information and domain ontologies.

BACKGROUND

Speech-based searching of text or frequently asked questions (FAQs) databases provide users with a way to solve problems with various devices or appliances including e.g., cars, mobile phones, etc. Quite often, however, a search query results in finding an extensive list of answers or documents that are to be presented to the user. Such extensive lists may be caused either by ambiguity in the user's query or by combining multiple hypotheses about user's input yielded by input recognition systems such as, for example, automatic speech recognition (ASR) or handwriting recognition. These input recognition systems are not 100% reliable and, in most instances, they output several possible hypotheses.

Presenting such extensive lists of possible answers may be very distracting and/or tedious to a user. Further, in instances where the user is primarily engaged in or focused on another activity (e.g., driving a car), the user might not be able to browse such extensive lists of possible answers. One alternative to presenting an extensive list of all possible answers is to present an N-best list. However, even N-best lists may distract the user for the same reasons discussed above.

There have been a few attempts to alleviate the aforementioned problems. For example, both problems can be partly alleviated by having the user manually disambiguate the possible answers by refining his or her input query (e.g., rewording his or her search query). Additionally, a system may narrow down a user input query by selecting a particular ASR hypothesis from multiple ASR hypotheses. However, in some cases, such a process for disambiguation is not possible or satisfactory (e.g., when merging multiple ASR hypotheses together).

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

There is a persistent need to more accurately determine the answer to a user's query without having the user browse an extensive list of primarily incorrect answers.

Various aspects of the disclosure provide more efficient, effective, functional, and convenient ways of providing search disambiguation. In particular, in one or more embodiments discussed in greater detail below, search disambiguation functionalities are implemented, and/or used in a number of different ways to provide one or more of these and/or other advantages.

In some embodiments, a computing device may receive a natural language input from a user. The computing device may identify a plurality of hypotheses for the natural language input. The computing device may map the plurality of hypotheses to one or more concepts of a plurality of concepts of an ontology by annotating the one or more concepts. The ontology may include the plurality of concepts respectively connected by a plurality of relations. The computing device may determine that a similarity metric measuring the similarity between the annotated one or more concepts and annotations of answers is below a predetermined threshold. In response, the computing device may disambiguate the annotated one or more concepts using the ontology. The computing device may present output to the user based on the disambiguation.

In some embodiments, a computing device may disambiguate one or more hypotheses associated with a natural language input and mapped to one or more concepts, of a plurality of concepts, of a first ontology based on a second ontology different from the first ontology and a current context associated with one of the one or more concepts.

These features, along with many others, are discussed in greater detail below.

BRIEF DESCRIPTION OF THE DRAWINGS

The present disclosure is illustrated by way of example and not limited in the accompanying drawings in which like reference numerals indicate similar elements and in which:

FIGS. 8-10 illustrate various user interfaces associated with search disambiguation in accordance with one or more illustrative aspects discussed herein.

DETAILED DESCRIPTION

In the following description of the various embodiments, reference is made to the accompanying drawings, which form a part hereof, and in which is shown by way of illustration various embodiments in which the search disambiguation solution may be practiced. It is to be understood that other embodiments may be utilized and structural and functional modifications may be made without departing from the scope of aspects discussed herein. The search disambiguation system is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
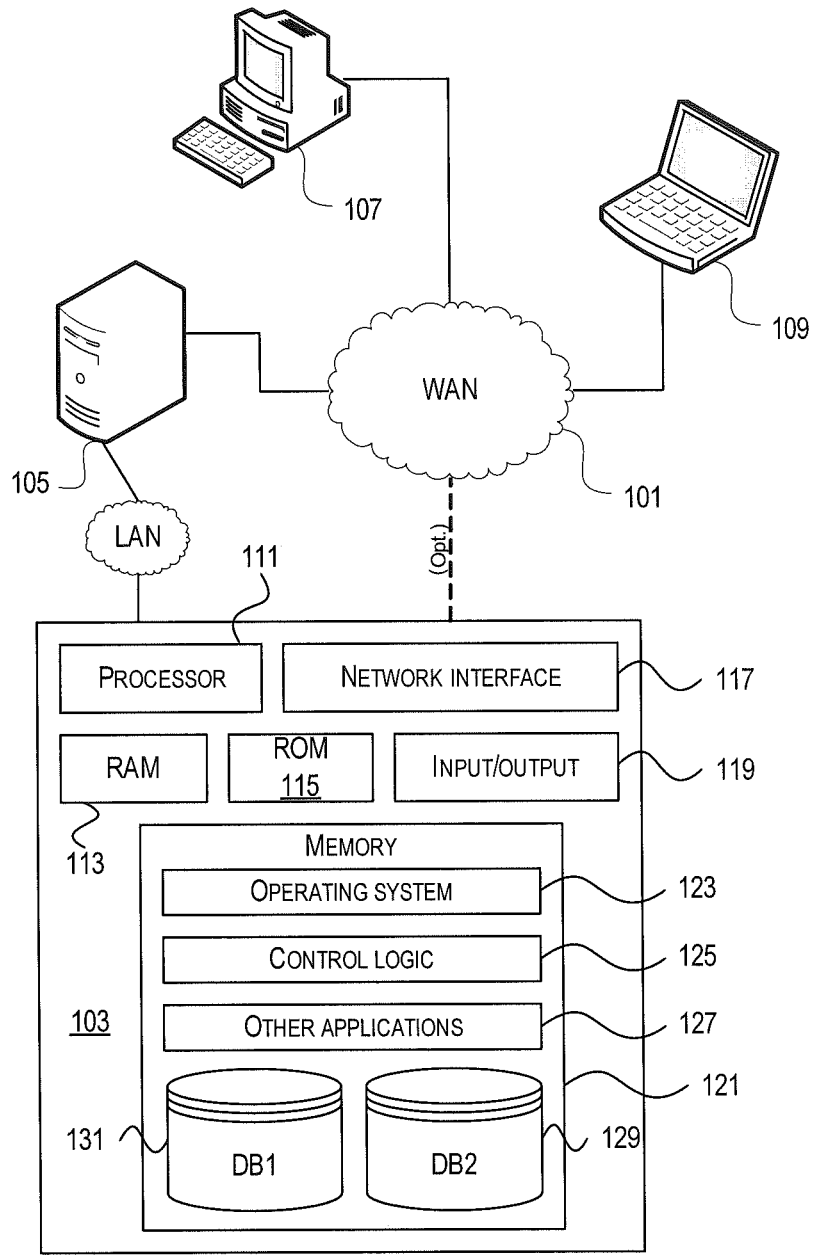
FIG. 1 depicts an illustrative network architecture and data processing device that may be used to implement one or more illustrative aspects described herein.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with aspects discussed herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the search disambiguation system may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein.

The search disambiguation system may be implemented using the network architecture described in FIG. 1. For example, the search disambiguation system may be implemented via one or more of the data server 103, the web server 105, and/or the client computers 107, 109.

Figure 2:
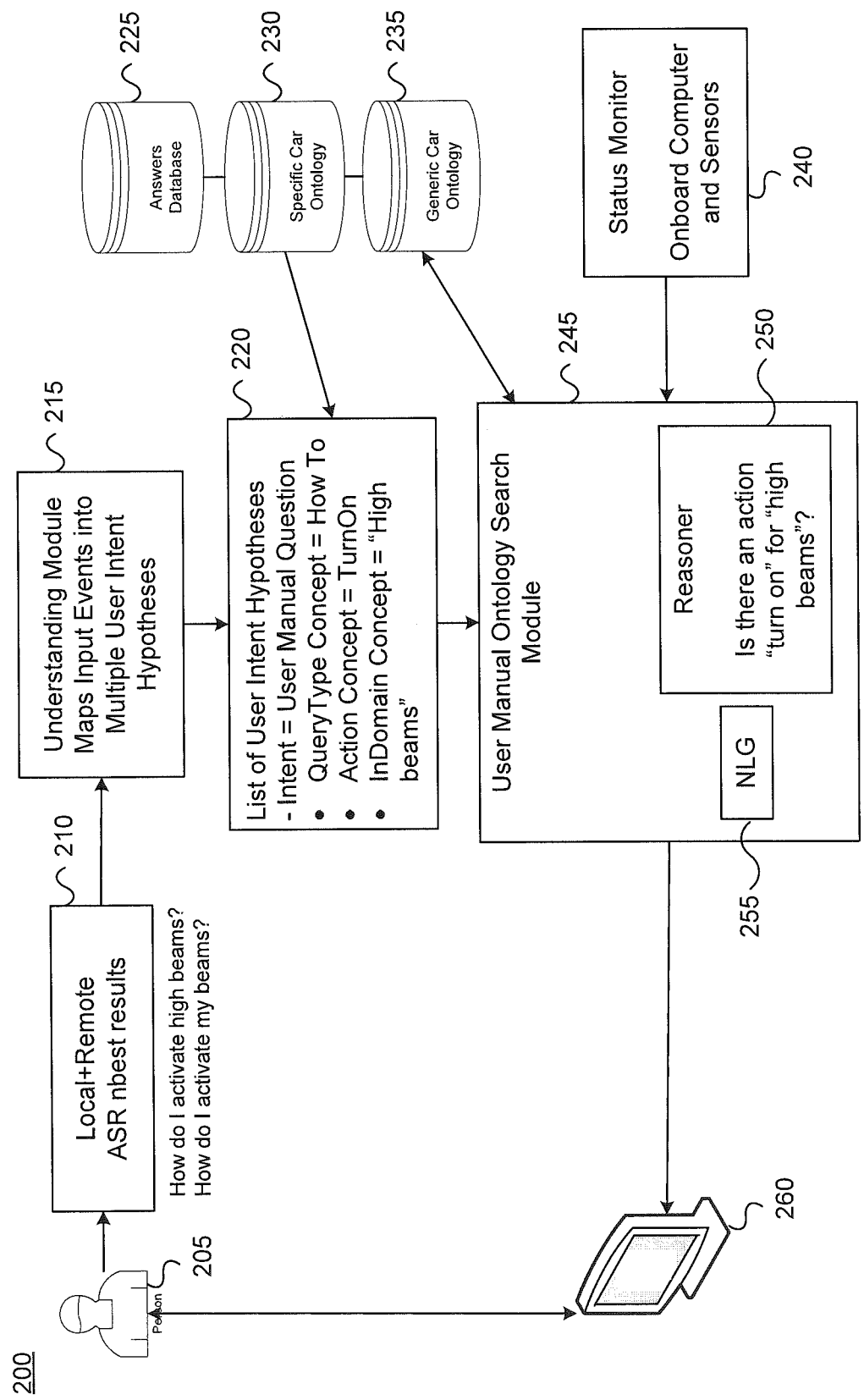
FIG. 2 depicts an illustrative system flow diagram for contextual search disambiguation using domain ontologies in accordance with one or more illustrative aspects discussed herein.

FIG. 2 depicts an illustrative system flow diagram for contextual search disambiguation using domain ontologies in accordance with one or more illustrative aspects discussed herein. The search disambiguation system 200 may include one or more software modules embodied on one or more components (e.g., the data server 103, the web server 105, the client computers 107, 109, and/or any computing device). For example, the system 200 may include an input recognition module 210, an understanding module 215, an answers database 225 of annotated answers, a domain-specific ontology 230, a generic domain-specific ontology 235, an ontology search module 245, a status monitor 240, and an input/output component 260 (e.g., a display). The contextual search disambiguation system may be used to accurately answer a user's query regarding an appliance without having a user 205 browse an extensive list of primarily incorrect answers. The appliance may be, for example, a vehicle (e.g., a car), a mobile phone, or any other appliance. For purposes of illustration, FIG. 2 illustrates an example of a search disambiguation system for vehicles.

Figure 3:
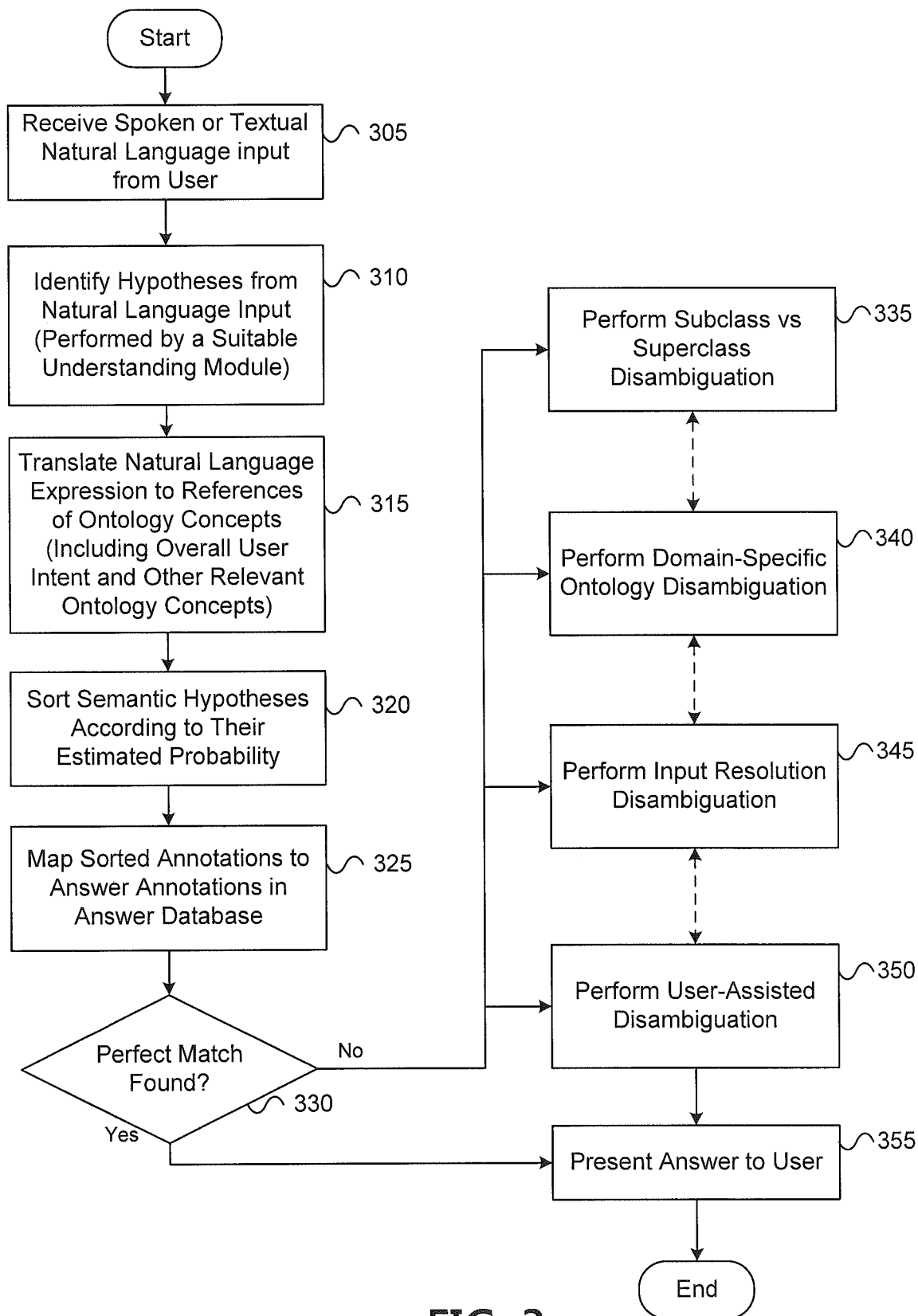
FIG. 3 depicts a flowchart of an illustrative method of providing contextual search disambiguation using ontologies in accordance with one or more illustrative aspects discussed herein.

FIG. 3 depicts a flowchart of an illustrative method of providing search disambiguation in accordance with one or more illustrative aspects discussed herein. In one or more embodiments, the method of FIG. 3 and/or one or more steps thereof may be performed by a computing device (e.g., the data server 103, the web server 105, the client computers 107, 109, and/or any computing device). In other embodiments, the method illustrated in FIG. 3 and/or one or more steps thereof may be embodied in computer-executable instructions that are stored in a computer-readable medium, such as non-transitory computer-readable memory.

As seen in FIG. 3, the method may begin at step 305 in which a search disambiguation system may receive spoken or textual natural language input from a user. For example, in step 305, the input recognition module 210 (e.g., an automatic speech recognizer (ASR), an automatic handwriting recognizer, and/or any other recognizer) may receive a natural language input (e.g., a spoken or textual utterance of a command or a query) from the user 205 in, for example, the English language and/or any other language.

In step 310, the search disambiguation system may identify one or more hypotheses from the natural language input. For example, in step 310, the input recognition module 210 may generate, using the natural language input and a knowledge database, an N-best list of multiple different hypotheses possibly representing the utterance (e.g., multiple ASR hypotheses or transcriptions that represent a spoken utterance). In some instances, one or more of the hypotheses may incorrectly represent the utterance of the user 205 while one or more other hypotheses may correctly represent the utterance of the user 205. Following the vehicle example shown in FIG. 2, a first hypothesis of the user's utterance may be "How do I activate high beams?" and a second hypothesis of the user's utterance may be "How do I activate my beams?" Additionally or alternatively, in some embodiments, understanding module 215 may perform step 310. In such embodiments, the functions discussed herein as being performed by input recognition module 210 may be performed by understanding module 215.

In some instances, the input recognition module 210 may be local to the computing device that receives natural language utterance from the user. In other words, the computing device that receives the utterance from the user may, using the input recognition module 210, generate the N-best list of hypotheses. In other instances, the input recognition module 210 may be located at a remote computing device different from the computing device that receives the utterance from the user. In such instances, the computing device that received the utterance from the user may send the utterance from the user to the remote computing device. In response, the computing device may receive the N-best list of hypotheses generated by and sent from the remote computing device. In yet other instances, a combination of local and remote recognizers may be used by the system 200. For example, the computing device may locally generate a first N-best list of hypotheses (e.g., a first subset of hypotheses). Additionally, the computing device may send the utterance to the remote recognizer and may receive a second N-best list of hypotheses (e.g., a second subset of the hypotheses).

Figure 4:
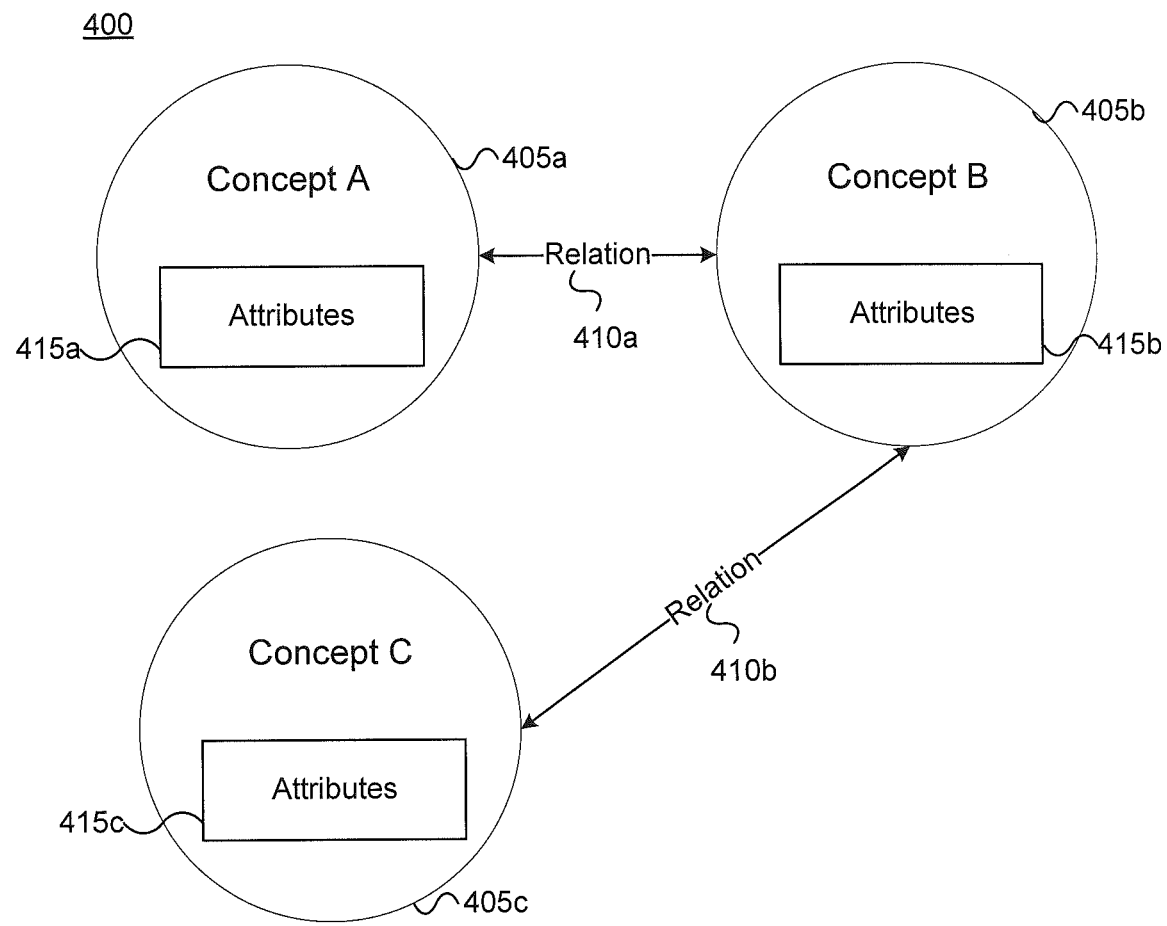
FIGS. 4-6 respectively depict an illustrative ontological scheme, an illustrative generic ontology for multiple vehicle models, and an illustrative domain-specific ontology for a specific vehicle model in accordance with one or more illustrative aspects discussed herein.
Figure 5:
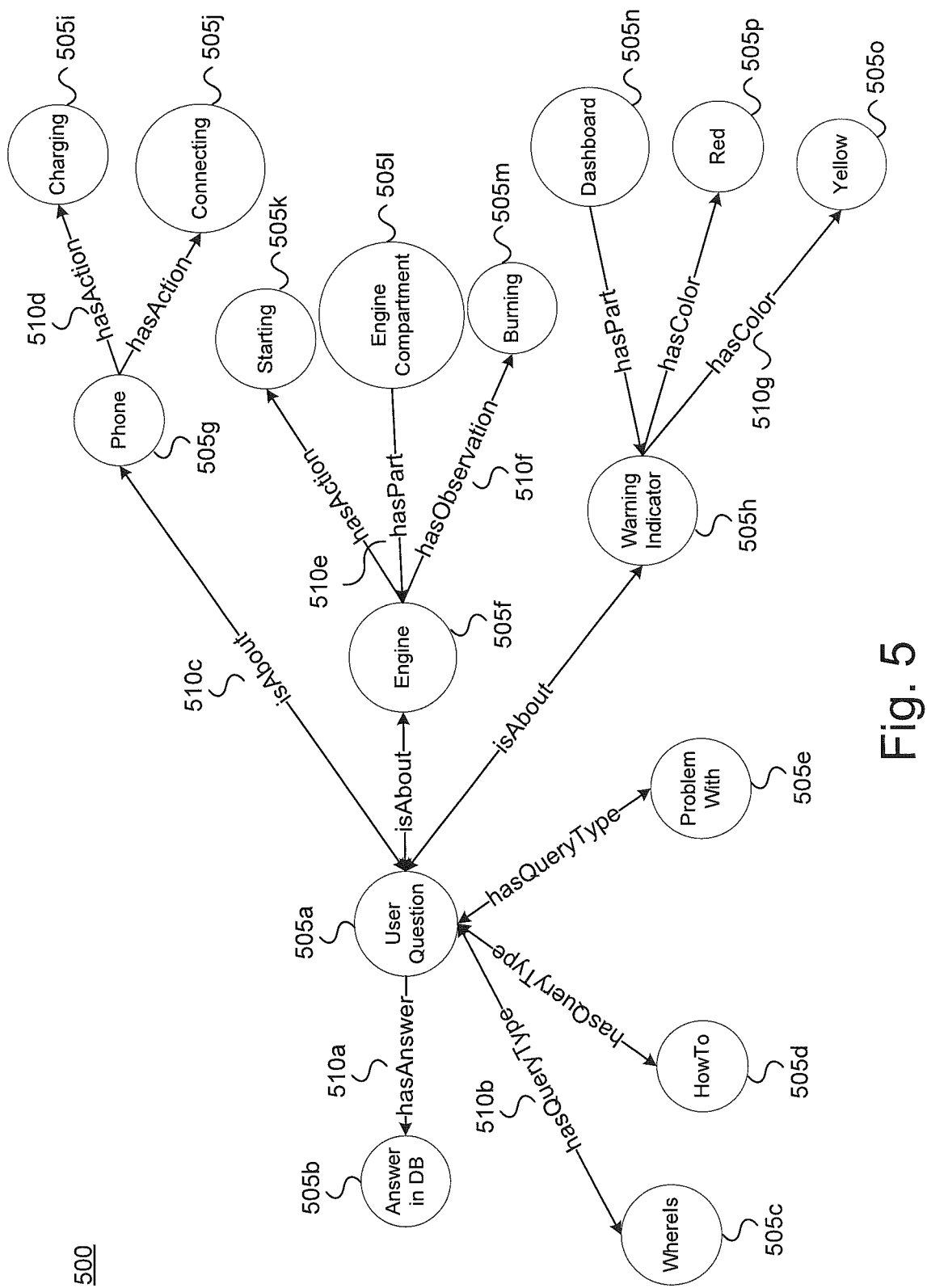
Figure 6:
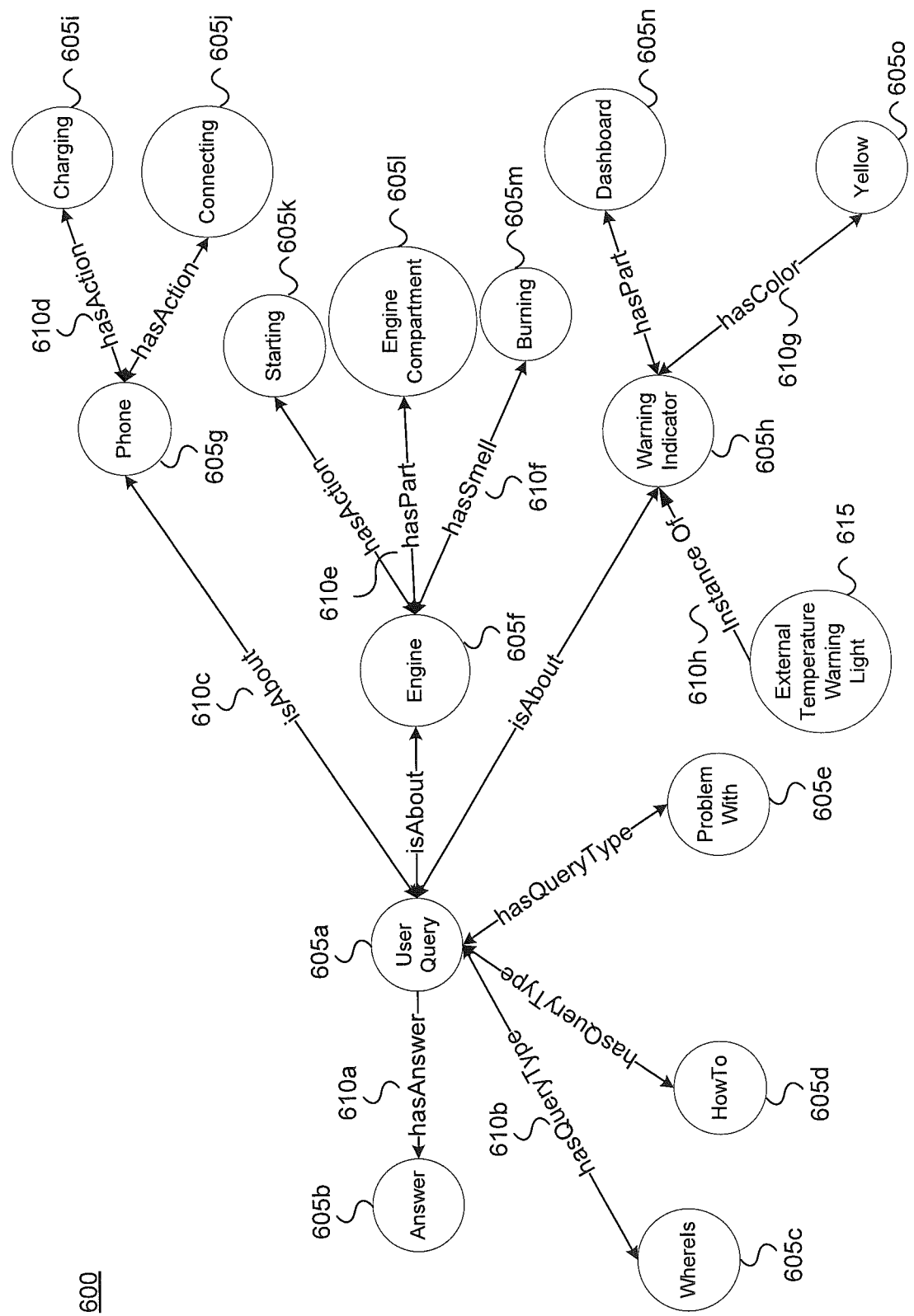

In step 315, the search disambiguation system may translate natural language expression to references of ontology concepts including overall user intent and other relevant ontology concepts. For example, understanding module 215 may (e.g., during runtime) match extraction evidence associated with relevant ontology concepts to parts of the analyzed text of the natural language expression. FIGS. 4-6 respectively depict an illustrative ontological scheme, an illustrative generic ontology for multiple vehicle models, and an illustrative domain-specific ontology for a specific vehicle model in accordance with one or more illustrative aspects discussed herein. As shown in FIG. 4, an ontology 400 may include multiple concepts 405 (shown as nodes) respectively connected by a plurality of relations 410 (shown as edges). For example, concept B 405*b* may be connected to concept A 405*a* by relation 410*a* and may also be connected to concept C 405*c* by relation 410*b*. Additionally, each of the concepts 405 may include one or more attributes 415 associated with that particular concept 405. Under a web ontology language (OWL) standard, an attribute 415 may be data type properties. For example, a concept "CD_player" may include attributes: manufacturer="...," model="...." For example, a concept "Car" may include attribute "date_of_last_inspection."

The generic domain ontology 235 may describe an appliance (e.g., an automobile, a mobile phone, etc.) domain in general. The generic domain ontology 235 (also referred to herein as a generic ontology) may represent a generic domain describing multiple (e.g., all) possible concepts that appear in the domain (e.g., concepts that are associated with a type of appliance across multiple different models of the appliance). In this instance, the generic domain ontology 235 of FIG. 2 may be a generic ontology for vehicles (e.g., cars) as shown by the generic domain ontology 500 of FIG. 5. For example, in a vehicle domain, the generic ontology 500 may describe multiple (e.g., all) possible concepts associated with multiple vehicle user manuals of different model vehicles. For example, the generic ontology 500 may include multiples concepts 505 interconnected by multiple relations 510. Note that FIG. 5 shows only a portion of a generic ontology for vehicles and may include multiple other concepts and/or relations not shown.

The domain-specific ontology 230 may describe an appliance domain specifically. The domain-specific ontology 230 may represent a domain of a particular model of an appliance describing the concepts that are a part of the particular model. In other words, unlike the generic domain ontology 235, the domain-specific ontology 230 might not include concepts of another particular model that the particular model might not contain. In this instance, the domain-specific ontology 230 may be a domain-specific ontology for a particular model of a vehicle (e.g., a car) as shown by the domain-specific ontology 600 of FIG. 6. For example, in a particular vehicle model domain, the domain-specific ontology 600 may describe only those concepts associated with the user manual of the particular vehicle model. The domain-specific ontology 600 may include multiple concepts 605 interconnected by multiple relations 610. Note that FIG. 6 shows only a portion of the domain-specific ontology for a particular model of an automobile.

The concepts 505, 605 of the ontologies 500, 600 may each be part of a concept category (e.g., an attribute (not shown) of each concept 505, 605 may include a concept category). The concept categories may include an indomain category, an action category, a location category, a querytype category, an observation category, an answer category, and a userquery category. The indomain category may include concepts for various items found in the domain. For example, the indomain category may include a phone concept 505$g$, 605$g$, an engine concept 505$f$, 605$f$, a warning indicator concept 505$h$, 605$h$, etc. While a mobile phone may not be part of (or even sold with) the automobile, because automobiles are often wirelessly connected to mobile phones to allow the mobile phone to utilize the automobile's audio input and output when placing calls, the ontologies 500, 600 may include the phone concept 505$g$, 605$g$. The action category may include concepts that describe possible actions of the indomain concepts. For example, the action category may include a recalling concept (not shown), a saving concept (not shown), a starting concept 505$k$, 605$k$, a charging concept 505$i$, 605$i$, a muting concept (not shown), etc. The location category may include concepts that describe a location of an item or component. For example, the location category may include a car interior concept (not shown), a dashboard concept 505$n$, 605$n$, a rear part concept (not shown), etc. The querytype category may include concepts that identify the type of user's question. For example, the querytype category may include a what concept (not shown), a howto concept 505$d$, 605$d$, a howmuch concept (not shown), a whereis concept 505$c$, 605$c$, a problemwith concept 505$e$, 605$e$, etc. The observation category may include concepts describing observed situations associated with an appliance (e.g., an automobile). For example, the observation category may include a red color concept 505$p$, a yellow color concept 505$o$, 605$o$, a smell concept (e.g., a burning concept 505$m$, 605$m$), a sound concept (not shown), a temperature concept (not shown), etc. The answer category may include one or more answer concepts 505$b$, 605$b$ respectively representing one or more answers in the answer database 225. The userquery category may include concepts representing instances of a user question concept 505$a$, 605$a$.

As noted above, the concepts 505, 605 are interconnected by several relations 510, 610. Relation types may include a hasAnswer relation 510$a$, 610$a$, a hasQueryType relation 510$b$, 610$b$, an isAbout relation 510$c$, 610$c$, a hasAction relation 510$d$, 610$d$, a hasPart relation 510$e$, 610$e$, a hasObservation relation 510$f$, 610$f$, a hasColor relation 510$g$, 610$g$, etc. The hasAnswer relation 510$a$, 610$a$ relates an instance of a user question concept 505$a$, 605$a$ to an instance of an answer concept 505$b$, 605$b$ (e.g., stored in the answers database 225). The hasQueryType relation 510$b$, 610$b$ relates an instance of user question concept 505$a$, 605$a$ to one of multiple different query type concepts (e.g., a whereis concept 505$c$, 605$c$, a how to concept 505$d$, 605$d$, a problemwith concept 505$e$, 605$e$, etc.).

The isAbout relation 510$c$, 610$c$ is a multi-valued relation describing a UserQuery instance. A range of the values may include all indomain concepts. For example, the isAbout relation may relate a subject of user's question or command to be about one or more indomain concepts (e.g., a phone concept 505$g$, 605$g$, an engine concept 505$f$, 605$f$, a warning indicator concept 505$h$, 605$h$).

The hasAction relation 510$d$, 610$d$ may relate an indomain concept to one or more action concepts (e.g., functions of the indomain concept). For example, the phone concept 505$g$, 605$g$ may have a hasAction relation 510$d$, 610$d$ to a charging concept 505$i$, 605$i$, a connecting concept 505$j$, 605$j$, etc. Similarly, the engine concept 510$e$, 610$e$ may have a hasAction relation 510$d$, 610$d$ to a starting concept 505$k$, 605$k$.

The hasPart relation 510$e$, 610$e$ may illustrate that an instance of an indomain concept may contain an instance of another indomain concept. For example, an engine compartment concept 505$l$, 605$l$ may have a hasPart relation 510$e$, 610$e$ to the engine concept 505$f$, 605$f$ (e.g., an engine compartment may contain an engine). Similarly, a dashboard concept 505$n$, 605$n$ may have a hasPart relation 510$e$, 610$e$ to a warning indicator concept 505$h$, 605$h$.

The hasObservation relation 510$f$, 610$f$ relates an instance of an indomain concept to an observation. For example, the engine concept 505$f$, 605$f$ may have a hasObservation relation 510$f$, 610$f$ of a burning concept 505$m$, 605$m$.

The hasColor relation 510$g$, 610$g$ may map colors to instances of indomain concepts. For example, a warning indicator concept 505$h$, 605$h$ may have a hasColor relation 510$g$, 610$g$ of a yellow concept 505$o$, 610$o$ and/or a red concept 505$p$ (e.g., a warning indicator may have a red color).

As will be discussed in greater detail below, the domain-specific ontology 600 might not have a concept 605 corresponding to each concept 505 of the generic ontology 500. For example, the domain-specific ontology 600 might not have a red color concept for a warning indicator concept 605$h$ unlike the generic domain ontology 500. For example, if the particular automobile model of the automobile does not have a warning indicator that has a red color, then the domain-specific ontology 600 might not have the corresponding red color concept. However, because the generic ontology 500 might not be specific to the particular automobile but does describe automobiles in general, the generic ontology 500 may have the red concept as described above since other models of automobiles may have warning indicators that are red in color.

The domain-specific ontology 600 may include one or more instances 615 for each concept 605 and the one or more instances 615 may be connected with their corresponding concept 605 via an instance of relation 610$h$. For example, an external temperature warning light 615 may be an instance of warning indicator concept 605$h$. As a result, the external temperature warning light 615 may be connected via an instance of relation 610$h$ with the warning indicator concept 605$h$.

Returning to FIG. 3, in step 315, the understanding module 215 may receive from the input recognition model 210 the n different ASR hypotheses (transcriptions) and, in response, may translate the ASR hypotheses into m corresponding intent/semantic hypotheses that an application understands where n represents the number of received ASR hypotheses and m represents the number of semantic hypotheses. Each of the ASR hypotheses may be a natural language expression and may be associated with an ASR confidence score determined by e.g., input recognition module 210, understanding module 215, etc. The ASR confidence score may represent how likely that particular ASR hypothesis matches the user input utterance. Each of the semantic hypotheses may include an intent describing the overall meaning of the user's input and may also include an optional list of slots describing attribute value pairs. Each slot may include one or more of a name, a canonical value, and one or more references to the literal strings found in sentences for use by understanding module 215 to identify each slot. A single semantic hypothesis may include multiple slots with the same name (e.g., the multiple carConcepts literals discussed below in the first semantic hypothesis). The names of the possible semantic slots in the semantic hypotheses may match the names of the ontological concepts to enable understanding module 215 to distill the ontological concepts from the semantic hypotheses.

Understanding module 215 may identify candidate intents, slots, and their values using extraction evidence (e.g., literal strings of the ASR hypotheses and heterogeneous context variables such as history of interaction, time of day, current location, etc.). For example, understanding module 215 may map each of the received ASR hypotheses to one or more concepts of one or more domain ontologies (e.g., the domain-specific ontology 230, the generic domain ontology 235, etc.) by annotating one or more concepts of the ontologies to generate one or more corresponding semantic hypotheses.

For example, the understanding module 215 may, during design time, utilize extraction evidence (e.g., text labels, extraction patterns, trained feature weights, or the like) attached to relevant ontology concepts, which is used during runtime to identify references to these concepts in input text using e.g., wordmatching techniques or trained named entity recognizers. For example, the concept "ClimateControl" may have extraction evidence attached in the form of string labels for use by understanding module 215 to match possible slot values in ASR hypotheses, such as, for example, "climate control," "A/C," "air conditioning," "climate," etc. For example, the concept "FogLamps" may be attached with extraction evidence string labels "fog lamps," "fog lights," etc. For example, the concept "Adjusting" may be attached with extraction evidence string labels "adjust," "modify," "set up," "tune," "customize," etc. For example, the concept "HighBeams" may be attached with extraction evidence string labels "high beams," "high beam lamps," etc. For example, the concept "TurnOn" may be attached with extraction evidence string labels "start," "activate," "run," "turn on," etc. For example, the concept "HowTo" may be attached with extraction evidence string labels "how to," "how do," "how," etc. Understanding module 215 may automatically utilize these textual string labels or patterns attached to the individual ontology concepts to match to the slot values in the ASR hypotheses. The ontologies may contain one or more versions of these labels for each supported language (e.g., one version for English, another version for Chinese, etc.). For example, a software utility may be used at build-time to convert all these labels or patterns defined in the ontologies to the representation used by a specific understanding module.

For example, understanding module 215 may receive three ASR hypotheses. The first ASR hypothesis may be "How do I turn on my high beams?" and may be associated with an ASR confidence score of 0.7 or 70%. The second ASR hypothesis may be "How do I turn on my hi beams?" and may be associated with an ASR confidence score of 0.5 or 50%. The third ASR hypothesis may be "Help do I town on my beans?" and may be associated with an ASR confidence score of 0.2 or 20%.

Understanding module 215 may map the above set of ASR hypotheses to two alternative semantic hypotheses and may assign each semantic hypothesis a corresponding semantic confidence. The first semantic hypothesis, which arises out of the first two ASR hypotheses, may be {intent=UserManualQuestion, slots=[queryType="HowTo" (literal="How do"), action="Start" (literal="turn on"), carConcept="HighBeams" (literals="high beams", "hi beams")] semantic_confidence=0.95]}. The second semantic hypothesis may be {intent=Help, slots= [helpTopic="town on my beans" (literal="town on my beans")], semantic confidence=0.1]}.

In some embodiments, the understanding module 215 might not map a portion of a hypothesis to a concept in the ontology. In such embodiments, the understanding module 215 may ignore (and/or otherwise not map) that portion of the hypothesis. Following the above example, the terms "I" and "my" might not have a matching concept in the ontology. As a result, the understanding module 215 may ignore those terms during the mapping step.

In step 320, the search disambiguation system may sort semantic hypotheses according to their estimated probability. For example, the search disambiguation system may receive semantic hypotheses from understanding module 215. These semantic hypotheses are sorted according to their semantic confidence, which is assigned by understanding module 215 so that it best estimates the probability of each semantic hypothesis being correct—that is, containing the correct intent and/or slot values. For example, in step 320, the understanding module 215 may assign the semantic confidence based on initial intent probabilities defined by the understanding module 215, matching of an annotated concept to a state pattern of an application, and/or probabilities provided by a statistical classifier using training data. Each semantic hypothesis in this sorted list is composed of a single "intent" concept annotation that expresses the general intention of the user, and zero or more concept annotations referring to in-domain concepts modeled by an ontology (e.g., ontologies 500, 600).

In some embodiments, the steps of generating semantic hypotheses and finding the annotations of intent and other ontology concepts may be an integral process. For example, one or more steps 310-325 may be performed simultaneously by a suitable understanding module (e.g., understanding module 215).

In step 325, the search disambiguation system may map the sorted annotated one or more concepts to answer annotations stored in an answer database. For example, in step 325, the user manual ontology search module 245 may receive groups of the sorted annotated one or more concepts and, in response, may attempt to map the annotations to the annotated answers stored in the answers database 225.

The answers database 225 may include natural language answers that are annotated by concepts from one or more of the generic ontology 500 and/or the domain-specific ontology 600. Each answer may be annotated by one or more sets of concept annotations (also referred to herein as user query annotation sets or considered answerDB annotation set). Each concept annotation identifies a single ontology concept. Each set of concept annotations describes a class of user questions (e.g., queries) for which the associated answer is suited. For example, the answer to the question "How do I start the car?" may be annotated by one or more concept annotations that describe certain user queries. For example, a first set of concept annotations may be: <QueryHowTo> <TurnOn> <Car>. For example, a second set of concept annotations may be: <QueryHowTo> <TurnOn> <Engine>.

In step 330, the search disambiguation system may determine if a perfect match has been found. For example, in step 330, the user manual ontology search module 245 may, for each of the semantic hypotheses, compute the semantic hypothesis' similarity with one or more (e.g., all) user query annotation sets in answers database 225 described in detail below. Using the similarity metric, user manual ontology search module 245 may determine if there is a perfect match between the semantic hypothesis received from understanding module 215 and a user query annotation set in answer database 225. A perfect match may occur when a semantic hypothesis precisely matches one user query annotation set in answer database 225. For example, the input semantic hypothesis <QueryHowTo> <TurnOn> <Car> perfectly matches the first user query annotation set discussed above (i.e., <QueryHowTo> <TurnOn> <Car>). In other words, each concept of the semantic hypothesis matches a corresponding concept annotation of the first user query annotation set. For perfect matches, the similarity metric discussed below reaches its maximum value of 1. In response to a determination that a perfect match has been found, the computing device may output and/or otherwise present (e.g., audible, visually, etc.) the answer to the user 205 as shown in step 355.

In some embodiments, a perfect match may occur when there might not be a perfect match. For example, user manual ontology search module 245 may consider an imperfect match as a perfect match when the imperfect match is a near perfect match. For example, user manual ontology search module 245 may construe an imperfect match as a perfect match when the similarity metric discussed below exceeds a predetermined threshold (e.g., greater than 0.95). Otherwise, in such embodiments, if the similarity metric of the semantic hypothesis to the one or more user query annotation sets is equal to or below the predetermined threshold, user manual ontology search module 245 may construe such a circumstance as an imperfect match.

The similarity metric may define a level of similarity between a particular semantic hypothesis and a candidate user query annotation set. For example, user manual ontology search module 245 may determine a first set of float numbers from the concepts of the particular semantic hypothesis. User manual ontology search module 245 may also determine a second set of float numbers from the concepts of the candidate user query annotation set. User manual ontology search module 245 may then generate a first vector including the first set of float numbers associated with the semantic hypothesis and a second vector including the second set of float numbers associated with the candidate user query annotation set. Both vectors may be of equal length and contain one element for each concept that exists in at least one of the particular semantic hypothesis or the candidate user query annotation set.

The first set of float numbers for the particular semantic hypothesis and the second set of float numbers for the candidate user query annotation set may represent costs associated with four types of possible edit operations (e.g., insertion, deletion, substitution, and match). The operations may be defined relative to the candidate user query annotation set in answer database 225. For example, insertion of a particular concept takes place when the particular semantic hypothesis includes the particular concept but the particular concept might be missing from the candidate user query annotation set. Costs of each type of operation may be defined by a domain expert for individual concepts or for groups of concepts. Operations that change the meaning of an annotation set more significantly (such as deleting or inserting an important "car concept") may be assigned higher costs.

Insertion and deletion costs may be defined as float numbers between 0.0 and 1.0 and may be defined by a domain expert for each concept individually or globally for concept groups. For example, each of the concepts that are descendants of an "Action" concept may share the same insertion and deletion costs. Substitution costs between concepts may be defined in a 2-dimensional table of float numbers between 0.0 and 1.0. The substitution cost may be based on superclass/subclass hierarchy relationships between each pair of concepts. For example, user manual ontology search module 245 may use a particular cost for substituting a parent concept by its direct child concept and a higher cost when substituting an ancestor concept by a more distant descendant concept of the ancestor concept.

Substitution costs may be based on the distance between concepts when following chains of relationships of a certain type. For example, the concept "Entertainment" may have child concepts "CDPlayer", "MP3Player", "Radio". These child concepts are not in any superclass/subclass relationship with respect to one another. However, because these concepts have a common parent concept, the distance between each of these concepts is very small (e.g., below a predetermined threshold value). For example, the distance between two concepts may be equivalent to 2 (1 measure of distance for generalization plus 1 measure of distance for specialization). As a result, these concepts may be more easily substitutable than a pair of concepts whose distance is greater. In other words, the substitution cost of a first pair of concepts may be lower than the substitution cost of a second pair of concepts when the first pair of concepts are separated by a first distance less than a second distance separating the second pair of concepts.

Figure 7:
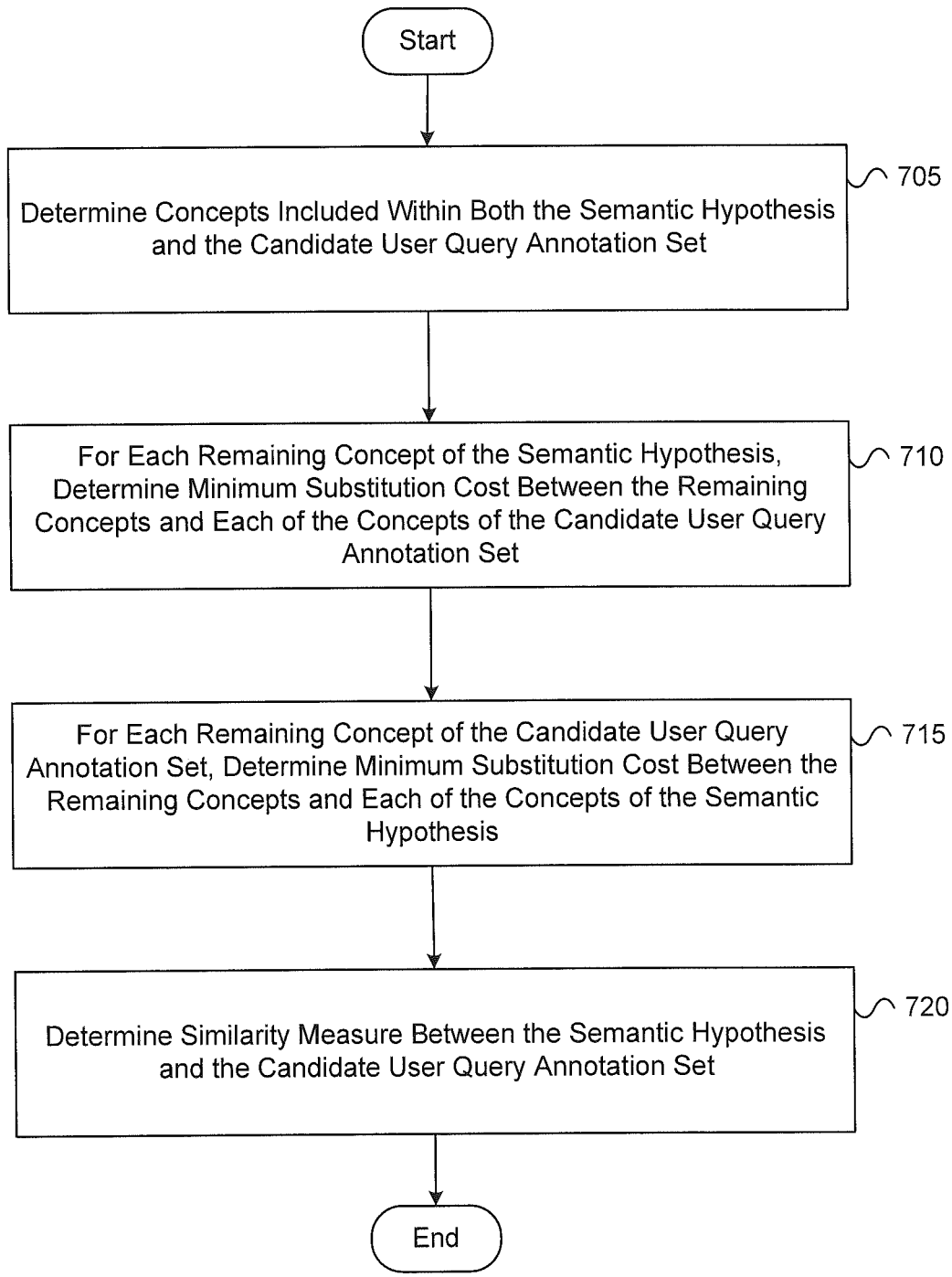
FIG. 7 depicts a flowchart of an illustrative method of constructing vectors in accordance with one or more illustrative aspects discussed herein.

FIG. 7 depicts a flowchart of an illustrative method of constructing vectors in accordance with one or more illustrative aspects discussed herein. In one or more embodiments, the method of FIG. 7 and/or one or more steps thereof may be performed by a computing device (e.g., the data server 103, the web server 105, the client computers 107, 109, and/or any computing device). In other embodiments, the method illustrated in FIG. 7 and/or one or more steps thereof may be embodied in computer-executable instructions that are stored in a computer-readable medium, such as non-transitory computer-readable memory.

As seen in FIG. 7, the method may begin at step 705 in which user manual ontology search module 245 may determine one or more (e.g., all) concepts included within both the semantic hypothesis and the candidate user query annotation set (e.g. a match operation) and may place the value 1.0 in both vectors. For example, a particular semantic hypothesis may include the concepts <QueryWhereIs> <Adjusting> and <Temperature>. The candidate user query annotation set may include the concepts <QueryHowTo> <Increasing> and <Temperature>. Thus, user manual ontology search module 245 may determine that the concept <Temperature> may be found in both the semantic hypothesis and the candidate user query annotation set and, as a result, may place a value of 1.0 in both vectors as shown in the table below.

In step 710, for each of the remaining concepts that appear in the semantic hypothesis only (also referred to herein as the remaining semantic concepts), user manual ontology search module 245 may determine a minimum substitution cost between those remaining semantic concepts and each (e.g., all) of the concepts in the candidate user query annotation set. Since one or more of the remaining semantic concepts may be related to one or more of the concepts in the candidate user query annotation set, user manual ontology search module 245 may substitute one or more of the remaining semantic concepts with the related concepts of the candidate user query annotation set with minimal cost. For example, an "Adjusting" concept may be substituted with an "Increasing" concept. For example, a "Washer" concept may be substituted with a "WindscreenWasher" concept.

In such cases, the cost may be equivalent to a minimum substitution cost of the remaining semantic concepts, a removal or deletion cost of the remaining semantic concepts, and/or insertion cost of the related concepts of the candidate user query annotation set. User manual ontology search module 245 may use and/or otherwise assign the cost as a value of an element for one of the vectors and may use and/or otherwise assign a value of 0 for the other vector as shown in the table below.

In step 715, for each of the remaining concepts that appear in the candidate user query annotation set (also referred to herein as the remaining answer concepts), user manual ontology search module 245 may determine the minimum substitution cost between one or more of the remaining answer concepts and each (e.g., all) of the concepts of the particular semantic hypothesis. In such cases, the cost may be equivalent to a minimum substitution cost of the remaining answer concepts, a removal or deletion cost of the remaining answer concepts, and/or insertion cost of the related concepts of the particular semantic hypothesis. User manual ontology search module 245 may use and/or otherwise assign the cost as a value of an element for one of the vectors and may use and/or otherwise assign a value of 0 for the other vector as shown in the table below. As a result, the vectors may include their respective floating point numbers representing the costs discussed above. Applying the above steps 705-715 to the hypothesis and candidate user query annotation set discussed in step 705, user manual ontology search module 245 may produce and/or otherwise construct vectors as shown by the following table:

| Concept | First Vector Associated with Semantic Hypothesis | Second Vector Associated with Candidate Set | Operation |
|---|---|---|---|
| <QueryWhereIs> | 0.0 | 0.5 | Insertion |
| <Adjusting> | 0.0 | 0.06 | Substitution |
| <Temperature> | 1.0 | 1.0 | Match |
| <QueryHowTo> | 0.6 | 0.0 | Deletion |
| <Increasing> | 0.06 | 0.0 | Substitution |

In step 720, user manual ontology search module 245 may determine the similarity between the first vector and the second vector and, thus, the similarity of the semantic hypothesis with the candidate user query annotation set. The similarity metric may be a cosine similarity between the first and second vectors and may be calculated using the following formula:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

A may represent the first vector associated the input semantic hypothesis and B may represent the second vector associated with the candidate user query annotation. Applying the formula to the first and second vectors of the above example, user manual ontology search module 245 may determine the cosine similarity to be equivalent to 0.0*0.5+ 0.0*0.06+1.0*1.0+0.6*0.0+0.06*0.0/sqrt(0.0*0.0+0.0*0.0+ 1.0*1.0+0.6*0.6+0.06*0.06)*sqrt(0.5*0.5+0.06*0.06+ 1.0*1.0+0.0*0.0+0.0*0.0)=1/sqrt(1.363)*sqrt(1.254)=0.96.

For each semantic hypothesis, user manual ontology search module 245 may sort the user query annotation sets in answer database 225 by their measured similarity to the semantic hypothesis yielding a list of possible answers to the semantic hypothesis ordered by similarity to the semantic hypothesis. Because there may be multiple annotation sets defined for one answer in answer database 225, each list may include several annotation sets that all link to a single answer. Only the most similar annotation set may be retained in each list for a single answer.

User manual ontology search module 245 may score each annotation set of each list by a final score reflecting the confidence of the semantic hypothesis produced by understanding module 215. The final score may be determined using the following formula:

Final_score=similarity*semantic_confidence

Semantic confidence may represent the confidence of the semantic hypothesis used to produce the candidate answer list. User manual ontology search module 245 may produce a final answer list by adding each of the annotations sets of each list and sorting the annotation sets according to their final score. In some embodiments, for annotation sets linking to the same answer, only the highest scoring annotation set and associated answer is added to the final answer list. In other words, lower scoring annotation sets are not added to the final answer list. In some embodiments, user manual ontology search module 245 may then output the final answer list to a particular application that decides how best to present the candidate answers.

Returning to FIG. 3, in response to a determination that an imperfect match has been found, the computing device may identify the sorted annotations (e.g., the sorted semantic hypotheses) as being ambiguous and, in response, may disambiguate the sorted annotations by performing one or more steps 335-350. For example, an imperfect match may be found when one or more of the sorted annotations did not match the annotated answers (e.g., a candidate user query annotation set) or, as discussed above, when the similarity metric between a semantic hypothesis and a candidate user query annotation set does not exceed (i.e., is equal to or below) a predetermined threshold.

In step 335, the search disambiguation system may perform subclass versus superclass (e.g., hierarchy) disambiguation. For example, in step 335, a general concept (e.g., a superclass concept) may have several possible species concepts (e.g., subclass concepts). Using one or more domain ontologies, the user manual ontology search module 245 may, via a reasoner 250, determine that a particular annotation is of a superclass concept. In response, the user manual search module 245 may determine the subclass concepts of the superclass concept. For example, a light concept may be a superclass having a headlight concept, a high beams concept, and a fog lamps concept as its subclass concepts.

The user manual ontology search module 245 may receive contextual information (e.g., a current context) from the status monitor 240. The status monitor 240 may include one or more sensors associated with the appliance (e.g., the vehicle, mobile phone, etc.), and/or an onboard computer of the appliance. The status monitor 240 may send the contextual information in response to receiving a request from the user manual ontology search module 245. The contextual information may include information associated with one or more of the subclasses concepts.

For example, when the user 205 asks the question "how do I turn on the lights?" The understanding module 215 may annotate this hypothesis associated with this query with the following annotations: a queryhowto annotation, a starting annotation, and a light annotation. Using the generic ontology 500 and/or the domain-specific ontology 600, the user manual ontology search module 245 may determine that the light annotation is associated with a superclass concept and, in response, may determine its subclass concepts (e.g., a headlights concept, a high beams concept, and a fog lamps concept). The user manual ontology search module 245 may be connected to the status monitor 240 (e.g., the onboard computer and sensors) of the vehicle. In this example, the user manual ontology search module 245 may receive an indication from one of the sensors and/or the onboard computer of the vehicle that the headlights are currently on. The user manual ontology search module 245 may, using this contextual information, disambiguate what the user 205 meant by the word "light" in her query. In other words, the user manual ontology search module 245 may filter and/or otherwise eliminate the subclass headlights concept from the annotated answers. The rationale for eliminating the subclass headlights concept is that the user likely would not ask the question "how do I turn on the lights?" if the user was referring to the headlights because the headlights are already on.

Additionally or alternatively, in this example, the user manual ontology search module 245 may receive from the onboarding computer information about the current time, current weather conditions, and/or the weather forecast. The weather forecast for this time may indicate that fog may be present. Accordingly, the user manual ontology search module 245 may select the fog lamp subclass concept as the best (e.g., most likely) answer to the user's 205 question and may output the answer associated with the fog lamp subclass concept to the user 205. The rationale for selecting the fog lamp subclass concept over, for example, the high beam subclass concept is that the presence of foggy weather conditions strongly suggests that the user is referring to fog lamps when she used the word "lights" in her question.

Figure 8:
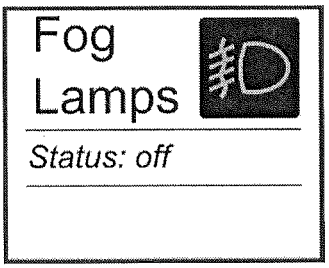
Figure 8:
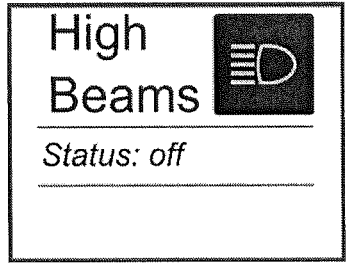
Figure 8:
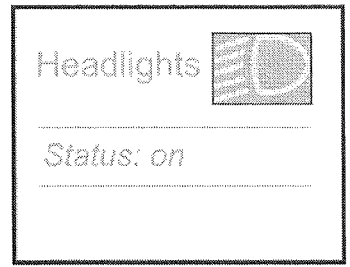

Additionally or alternatively, a computing device (e.g., output component 260) may display potential answers associated with each subclass concept on a user interface as shown in FIG. 8. In some embodiments, candidates that have been filtered out may be (grayed out) as shown in FIG. 8 or may be left out entirely. In some embodiments, the status associated with each of the subclass concepts may also be displayed by the output component 260.

Additionally or alternative, in some embodiments, the search disambiguation system may perform subclass to superclass disambiguation. For example, an automatic air conditioning concept may be a subclass concept of a superclass air condition concept. For example, an increasing concept may be a subclass concept of a superclass adjusting concept.

In step 340, the search disambiguation system may perform domain-specific ontology disambiguation. For example, as discussed above, the generic ontology 500 may describe multiple (e.g., all) possible concepts that appear in the vehicle domain across multiple different models. As discussed above, a domain-specific ontology 600 may describe those concepts associated with a particular vehicle model (including e.g., its user manual) and might not include concepts specific to other models. Using the domain-specific ontology 600, the user manual ontology search module 245 may determine and/or otherwise identify whether the input utterance and/or an associated one or more hypotheses relate to one or more concepts that might not be part of the domain-specific ontology 600. In response to a determination that the domain-specific ontology 600 does not include and/or otherwise contain a concept associated with a portion (also referred to herein as an element) of an input utterance and/or a hypothesis, the understanding module 215 might not map the element to the domain-specific ontology but may map the element to the generic ontology.

For example, one hypothesis may relate to a parking brake and another hypothesis may relate to a parking aid. In step 315, the understanding module 215 may map the parking brake hypothesis to a parking brake concept (not shown) of the domain-specific ontology 600. However, the understanding module 215 might not map the parking aid hypothesis to any concept of the domain-specific ontology 600 when, for example, the domain-specific ontology 600 might not include a parking aid concept. However, the understanding module 215 may map the parking aid hypothesis to a parking aid concept (not shown) of the generic ontology 500.

In instances when there are multiple hypotheses and at least one of the hypotheses maps to the domain-specific ontology 600, the understanding module 215 and/or the user manual ontology search module 245 may filter out other hypotheses that might not map to the domain-specific ontology 600. In this example, because there are two hypotheses (e.g., the parking brake hypothesis and the parking aid hypothesis) and because the parking brake hypothesis maps to the domain-specific ontology 600, the understanding module 215 and/or the user manual ontology search module 245 may filter out the parking aid hypothesis because it does not map to the domain-specific ontology 600. The search disambiguation system filters out the parking aid hypothesis since it is not a part of the user's vehicle model. As a result, the search disambiguation system may return answers associated with a parking brake but might not return answers associated with a parking aid.

Additionally or alternatively, in some embodiments, in instances when there is only one hypothesis (i.e., a sole hypothesis) that does map to any concept of the domain-specific ontology 600, the search disambiguation system may provide and/or otherwise output to the user 205 an explanation (e.g., in step 355) explaining that this concept is not part of this appliance model. Following the parking aid example, the search disambiguation system may output an explanation that the particular vehicle model does not have a parking aid. Additionally or alternatively, in such instances, the search disambiguation system may determine and output proposed alternate concepts based collectively on the generic ontology 500 and the domain-specific ontology 600.

For example, the search disambiguation system may determine the proposed alternate concepts by mapping the sole hypothesis to generic ontology 500 to determine one or more alternate concepts related to the concept missing from the domain-specific ontology 600 within a predetermined relatedness measure. The relatedness measure may be based on subclass/superclass relationships (e.g., hierarchy of indomain concepts) of the generic ontology 500. For example, the search disambiguation system may, using the generic ontology 500, determine that the concept missing from the domain-specific ontology 600 is a subclass concept of a superclass concept and may determine other subclass concepts of the superclass concept. The search disambiguation system may then map those one or more concepts of the generic ontology 500 to one or more corresponding alternate concepts of the domain-specific ontology 600 if the domain-specific ontology 600 includes those corresponding alternate concepts. The search disambiguation system may then determine annotated answers associated with the alternate concepts that may be output to the user 205.

For example, the sole hypothesis may relate to an automatic air conditioner. The search disambiguation system may determine that the domain-specific ontology 600 might not include an automatic air conditioning concept and may also determine that the generic ontology 500 may include an automatic air conditioning concept (not shown). The search disambiguation system may, using the generic ontology 500, determine that the automatic air condition concept is a subclass concept of a superclass air conditioning concept and may also determine that the superclass air conditioning concept may include a manual air conditioning subclass concept and dual-zone air conditioning subclass concept. The search disambiguation system may map the manual air conditioning subclass concept to a manual air condition concept (not shown) of the domain-specific ontology 600. However, the search disambiguation system might not map the dual-zone air conditioning concept to the domain-specific ontology 600 when, for example, the domain-specific ontology 600 might not include a dual-zone air conditioning concept. Using this information, the search disambiguation system may output to the user 205 the alternate concept (e.g., the manual air conditioning concept) and/or annotated answers associated with the alternate concept.

In step 345, the search disambiguation system may perform input resolution disambiguation. For example, in step 345, the search disambiguation system may determine that multiple hypotheses are incompatible with one another. In such instances, the search disambiguation system may take advantage of the relations (e.g., a hasAction relation) to disambiguate the multiple incompatible hypotheses. For instance, the search disambiguation may eliminate a particular hypothesis from consideration when, for example, concepts associated with the hypothesis might not be connected by a relation (e.g., a hasAction relation).

For example, the understanding module 215 may receive three hypotheses. The first hypothesis may be "how do I connect phone?" The second hypothesis may be "how do I connect pertrol?" The third hypothesis may be "how do I connect player?" Based on these three hypotheses, it is unclear whether the input utterance from the user 205 referred to a phone, petrol, or a player and, thus, the hypotheses are incompatible. The understanding module 215 may map each of these three hypotheses to the generic ontology 500 and/or the domain-specific ontology 600. For instance, the understanding module 215 may map each of the three hypotheses to a howto concept 505*d*, 605*d* and a connecting concept 505*j*, 605*j* of the ontologies 500, 600. The understanding module 215 may map the first hypothesis to a phone concept 505*g*, 605*g*, the second hypothesis to a petrol concept (not shown), and the third hypothesis to a player concept (not shown). For example, the user manual ontology search module 245 may determine that concepts associated with a particular hypothesis might not have a relation between two or more of those concepts and, in response, may eliminate and/or otherwise filter out that hypothesis from consideration. Following the above example, because the connecting concept and the petrol concept might not be directly connected by a relation (e.g., a hasAction relation), the search disambiguation system may eliminate and/or otherwise filter out the second hypothesis relating to petrol and its associated petrol concept from consideration.

As discussed above, in some embodiments, the user manual ontology search module 245 may, in response to sending a request to the status monitor 240, receive contextual information from the status monitor 240 including information from one or more sensors associated with the appliance (e.g., a vehicle, mobile phone, etc.) and/or an onboard computer of the appliance. Following the above example, the onboard computer of the vehicle may detect that the phone of the user 205 is already connected to the vehicle via a wired connection or a wireless connection (e.g., Bluetooth, Wi-Fi, etc.). In such instances, the search disambiguation system may further disambiguate by eliminating and/or otherwise filtering out the first hypothesis and its associated phone concept from consideration leaving only the third hypothesis relating to the player concept. Accordingly, the user manual ontology search module 245 may output an annotated answer associated with the player to the user 205. The rationale is that the user 205 likely would not ask how to connect her phone if her phone was already connected to the vehicle.

In step 350, the search disambiguation system may perform user-assisted disambiguation. For example, in step 350, the search disambiguation system may determine each option (e.g., concepts associated with a hypothesis) using static knowledge, namely one or more ontologies (e.g., generic ontology 600, domain-specific ontology 600, etc.). The search disambiguation system may also determine dynamic knowledge, contextual information (e.g., status information associated with a concept) retrieved from the status monitor 240 (e.g., sensor data, onboard computer data, etc.). The search disambiguation system may then present multiple answers and their associated status information to the user 205 via a user interface and let the user 205 select the proper answer. In other words, the output device 260 may receive input (e.g., touch input, mouse input, verbal input, etc.) from the user 205 indicating the appropriate answer.

Following the above example relating to connecting one of a phone, petrol, or a player, the search disambiguation system may determine, using one or more ontologies, that first hypothesis is associated with a phone concept connected via hasAction relations to a connecting concept, a voice dialing concept, a charging concept, etc. In a similar manner, the search disambiguation system may determine that the second hypothesis is associated with a petrol concept connected via hasAction relations to a fill-in concept, a find gas station concept, etc. Similarly, the search disambiguation system may determine that the third hypothesis is associated with a player concept connected via hasAction relations to a connecting concept, a charging concept, and a playing music concept. The search disambiguation system may determine from the status monitor 240 that neither the phone nor the player are connected to the vehicle. Additionally, the computing device may determine that the remaining amount of petrol is at 50%.

Figure 10:
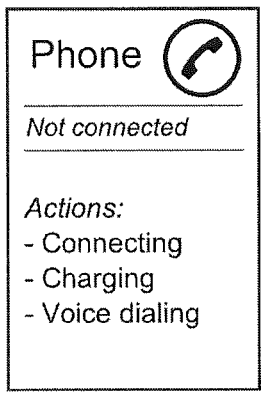
Figure 10:
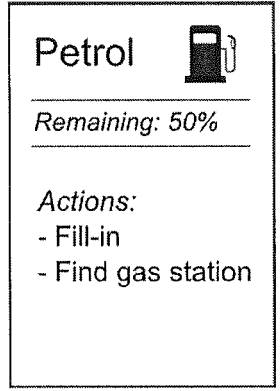
Figure 10:
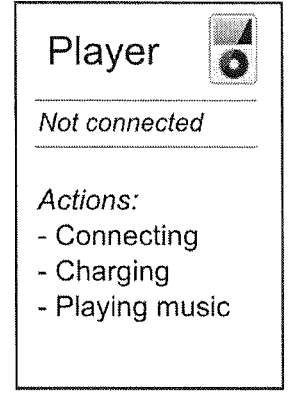

The output device 260 may display a user interface optimized to the cognitive load of the appliance. For example, if the appliance has a high cognitive load capability (i.e., a knowledge processing capability above a predetermined threshold value), then the appliance may present via the output device 260 a list and detailed pane user interface. An illustrative user interface following the above example for connecting one of a phone, petrol, or player is shown in FIG. 9. If the appliance has a low cognitive load capability (i.e., a knowledge processing capability below a predetermined threshold value), then the appliance may present via the output device 260 a user interface that lists information associated with each hypothesis. An illustrative user interface following the above example relating to connecting one of a phone, petrol, or a player is shown in FIG. 10.

As discussed at multiple points above, in step 355, the search disambiguation system may present an answer to the user. For example, once the search disambiguation system has disambiguated the ambiguous annotations via one or more steps of 335-350 and determined an answer, the answer may be presented (e.g., audibly, visually, etc.) to the user 205 via output component 260 (e.g., a display, speakers, etc.). In some embodiments, the user ontology search module 245 may include a natural language generator (NLG) 255 that may generate natural language answers based on the answers in the databases 225 and/or answer templates.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
   receiving, by a computing device, a natural language input from a user;
   identifying a plurality of hypotheses from the natural language input;
   mapping the plurality of hypotheses to one or more concepts of a plurality of concepts of an ontology by annotating the one or more concepts, wherein the ontology comprises the plurality of concepts respectively connected by a plurality of relations, wherein mapping includes determining, using the ontology, an alternate concept to the one of the one or more concepts annotated that is missing from a domain-specific ontology, and mapping the alternate concept to the one of the one or more concepts annotated of the domain-specific ontology based upon, at least in part, the plurality of relations;
   in response to determining that a similarity metric measuring the similarity between the one or more concepts annotated and annotations of answers is below a predetermined threshold, disambiguating the one or more concepts annotated using the ontology; and
   presenting output to the user based on the disambiguation.

2. The method of claim 1, wherein the natural language input from the user is a verbal utterance spoken by the user.

3. The method of claim 1, wherein the identifying the plurality of hypotheses from the natural language input further comprises:
   sending, from the computing device, the natural language input to a remote recognizer;
   receiving, at the computing device from the remote recognizer, a first subset of the plurality of hypotheses; and
   generating, by the computing device, a second subset of the plurality of hypotheses from the natural language input.

4. The method of claim 1, wherein the domain-specific ontology is specific to a user manual of an appliance.

5. The method of claim 4, further comprising:
   disambiguating the one or more concepts annotated based on a generic ontology comprising a plurality of generic concepts connected by a plurality of generic relations, wherein the generic ontology is associated with an appliance type of the appliance.

6. The method of claim 4, further comprising:
   determining, using the domain-specific ontology, that one of the one or more concepts annotated cannot be performed by the appliance or are not a part of the appliance; and
   disambiguating the one or more concepts annotated based on the determining.

7. The method of claim 6, further comprising:
   determining, using a generic ontology, an alternate concept to the one of the one or more concepts annotated, wherein the output is an indication that the one of the one or more concepts annotated cannot be performed and an indication of the alternate concept.

8. The method of claim 1, further comprising:
   in response to determining that one of the one or more concepts annotated is a superclass concept associated with a plurality of subclass concepts, determining, using the ontology, the plurality of subclass concepts:
   determining a current context associated with each of the plurality of subclass concepts; and
   disambiguating the one of the one or more concepts annotated based on the plurality of subclass concepts and the associated current context of each of the plurality of subclass concepts.

9. The method of claim 8, further comprising:
   determining an environmental context outside of an appliance and associated with one of the plurality of subclass concepts,
   wherein the disambiguating the one or more concepts annotated is based on the plurality of subclass concepts, the associated current context of each of the plurality of subclass concepts, and the environmental context.

10. The method of claim 1, wherein the output is a list of user-selectable options.

11. The method of claim 1, wherein the output is an answer associated with an answer template comprising one or more answer concepts to the natural language input.

12. The method of claim 1, wherein the ontology comprises categories of concepts including at least one of items concepts, actions concepts, locations concepts, query type concepts, observation concepts, answer concepts, and user-query concepts.

13. The method of claim 1, wherein the plurality of relations comprises at least one of a hasAction relation, a hasColor relation, a hasPart relation, an isAbout relation, and a hasAnswer relation.

14. An apparatus comprising:
   a processor; and
   a memory for storing computer readable instructions that, when executed by the processor, cause the apparatus to:
   receive a natural language input from a user;
   identify a plurality of hypotheses from the natural language input;
   map the plurality of hypotheses to one or more concepts of a plurality of concepts of an ontology by annotating the one or more concepts of the plurality of concepts associated with one or more of the plurality of hypotheses based on the ontology comprising the plurality of concepts respectively connected by a plurality of relations, wherein mapping includes determining, using the ontology, an alternate concept to the one of the one or more concepts annotated that is missing from a domain-specific ontology, and mapping the alternate concept to the one of the one or more concepts annotated of the domain-specific ontology based upon, at least in part, the plurality of relations;

in response to a determination that a similarity metric measuring the similarity between the one or more concepts annotated and annotations of answers does not exceed a predetermined threshold, disambiguate the one or more concepts annotated using the ontology; and present output to the user based on the disambiguation.

15. The apparatus of claim 14, wherein the domain-specific ontology is for a vehicle model and wherein the ontology is a generic ontology for multiple different vehicle models.

16. The apparatus of claim 14, wherein the computer readable instructions that, when executed by the processor, further cause the apparatus to:

disambiguate the one or more concepts annotated using a sensor associated with one of the one or more concepts annotated.

17. The apparatus of claim 14, wherein the computer readable instructions that, when executed by the processor, further cause the apparatus to:

in response to a determination that one of the one or more concepts annotated is a superclass concept associated with a plurality of subclass concepts, determine, using the ontology, the plurality of subclass concepts; and disambiguate the one of the one or more concepts annotated based on the plurality of subclass concepts.

18. A computer program product residing on a non-transitory computer readable storage medium having a plurality of instructions stored thereon which, when executed across one or more processors, causes at least a portion of the one or more processors to perform operations comprising:

receiving, by a computing device, a natural language input from a user;

identifying a plurality of hypotheses from the natural language input;

mapping the plurality of hypotheses to one or more concepts of a plurality of concepts of an ontology by annotating the one or more concepts, wherein the ontology comprises the plurality of concepts respectively connected by a plurality of relations, wherein mapping includes determining, using the ontology, an alternate concept to the one of the one or more concepts annotated that is missing from a domain-specific ontology, and mapping the alternate concept to the one of the one or more concepts annotated of the domain-specific ontology based upon, at least in part, the plurality of relations;

in response to determining that a similarity metric measuring the similarity between the one or more concepts annotated and annotations of answers is below a predetermined threshold, disambiguating the one or more concepts annotated using the ontology; and presenting output to the user based on the disambiguation.

19. The computer program product of claim 18, wherein the ontology comprises categories of concepts including at least one of items concepts, actions concepts, locations concepts, query type concepts, observation concepts, answer concepts, and userquery concepts.

20. The computer program product of claim 18, wherein the plurality of relations includes at least one of a hasAction relation, a hasColor relation, a hasPart relation, an isAbout relation, and a hasAnswer relation.

* * * * *